US008775143B2

(12) United States Patent
Routh et al.

(10) Patent No.: US 8,775,143 B2
(45) Date of Patent: Jul. 8, 2014

(54) SIMULTANEOUS SOURCE ENCODING AND SOURCE SEPARATION AS A PRACTICAL SOLUTION FOR FULL WAVEFIELD INVERSION

(75) Inventors: Partha S. Routh, Katy, TX (US); Sunwoong Lee, Houston, TX (US); Ramesh Neelamani, Houston, TX (US); Jerome R. Krebs, Houston, TX (US); Spyridon Lazaratos, Houston, TX (US); Carey Marcinkovich, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 373 days.

(21) Appl. No.: 13/229,252

(22) Filed: Sep. 9, 2011

(65) Prior Publication Data
US 2012/0073825 A1 Mar. 29, 2012

Related U.S. Application Data

(60) Provisional application No. 61/386,831, filed on Sep. 27, 2010, provisional application No. 61/386,828, filed on Sep. 27, 2010.

(51) Int. Cl.
*G06G 7/48* (2006.01)
(52) U.S. Cl.
USPC .......... 703/10; 703/2; 367/21; 702/6
(58) Field of Classification Search
USPC .......................................... 703/10
See application file for complete search history.

(56) References Cited

U.S. PATENT DOCUMENTS 3,812,457 A  5/1974 Weller
(Continued)

FOREIGN PATENT DOCUMENTS

EP  1 094 338  4/2001
EP  1 746 443  1/2007
(Continued)

OTHER PUBLICATIONS

Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.

(Continued)

*Primary Examiner* — Mary C Jacob
(74) *Attorney, Agent, or Firm* — ExxonMobil Upstream Research Company

(57) ABSTRACT

Method for simultaneous full-wavefield inversion of gathers of source (or receiver) encoded geophysical data to determine a physical properties model (118) for a subsurface region, especially suitable for surveys where fixed receiver geometry conditions were not satisfied in the data acquisition. Simultaneous source separation (104) is performed to lessen any effect of the measured geophysical data's not satisfying the fixed-receiver assumption. A data processing step (106) coming after the simultaneous source separation acts to conform model-simulated data (105) to the measured geophysical data (108) for source and receiver combinations that are missing in the measured geophysical data.

23 Claims, 4 Drawing Sheets
(4 of 4 Drawing Sheet(s) Filed in Color)

(56) References Cited

U.S. PATENT DOCUMENTS

| | | |
|---|---|---|
| 3,864,667 A | 2/1975 | Bahjat |
| 4,159,463 A | 6/1979 | Silverman |
| 4,168,485 A | 9/1979 | Payton et al. |
| 4,545,039 A | 10/1985 | Savit |
| 4,562,540 A | 12/1985 | Devaney |
| 4,575,830 A | 3/1986 | Ingram et al. |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,646,924 B2 | 1/2010 | Donoho |
| 7,672,194 B2 | 3/2010 | Jeffryes |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1* | 4/2010 | Eick et al. .................. 367/21 |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212909 A1 | 8/2010 | Baumstein et al. |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |

(56) References Cited

FOREIGN PATENT DOCUMENTS

| WO | WO 2009/067041 | 5/2009 |
|---|---|---|
| WO | WO 2009/0067041 | 5/2009 |
| WO | WO 2009/117174 | 9/2009 |

OTHER PUBLICATIONS

Hu, L.Z. et al. (1987), "Wave-field transformations of vertical seismic profiles," *Geophysics* 52, pp. 307-321.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Pratt, R.G. (1999), "Seismic waveform inversion in the frequency domain, Part 1: Theory and verification in a physical scale model," *Geophysics* 64, pp. 888-901.

Sheng, J. et al. (2006), "Early arrival waveform tomography on near-surface refraction data," *Geophysics* 71, pp. U47-U57.

Simard, P.Y. et al. (1990), "Vector Field Restoration by the Method of Convex Projections," *Computer Vision, Graphics and Image Processing* 52, pp. 360-385.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Tsvankin, I. (2001), "Seismic Signatures and Analysis of Reflection Data in Anisotropic Media," Elsevier Science, p. 8.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dunkin, J.W. et al. (1973), "Effect of Normal Moveout on a Seismic Pluse," *Geophysics* 38(4), pp. 635-642.

Igel, H. et al. (1996), "Waveform inversion of marine reflection seismograms for P impedance and Poisson's ratio," *Geophys. J Int.* 124i, pp. 363-371.

Lancaster, S. et al. (2000), "Fast-track 'colored' inversion," 70th SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Moghaddam, P.P. et al. (2010), "Randomized full-waveform inversion: a dimenstionality-reduction approach," 80th SEG Ann. Meeting, *Expanded Abstracts*, pp. 977-982.

Ostmo, S. et al. (2002), "Finite-difference iterative migration by linearized waveform inversion in the frequency domain," SEG Int'l. Expo. & 72nd Ann. Meeting, 4 pgs.

Pica, A. et al. (2005), "3D Surface-Related Multiple Modeling, Principles and Results," 2005 SEG Ann. Meeting, *SEG Expanded Abstracts* 24, pp. 2080-2083.

Rawlinson, N. et al. (2008), "A dynamic objective function technique for generating multiple solution models in seismic tomography," *Geophys. J. Int.* 178, pp. 295-308.

Routh, P. et al. (2011), "Encoded Simultaneous Source Full-Wavefield Inversion for Spectrally Shaped Marine Streamer Data," SEG San Antonio 2011 Ann. Meeting, pp. 2433-2438.

Shen, P. et al. (2003), "Differential semblance velocity analysis by wave-equation migration," 73rd Ann. Meeting of Society of Exploration Geophysicists, 4 pgs.

Shih, R-C. et al. (1996), "Iterative pre-stack depth migration with velocity analysis," *Terrestrial, Atmospheric & Oceanic Sciences* 7(2), pp. 149-158.

van Groenestijn, G.J.A. et al. (2009), "Estimating primaries by sparse inversion and application to near-offset reconstruction," *Geopyhsics* 74(3), pp. A23-A28.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Wu R-S. et al. (2006), "Directional illumination analysis using beamlet decomposition and propagation," *Geophysics* 71(4), pp. S147-S159.

Young, J. et al. (2011), "An Application of Random Projection to Parameter Estimation in partial Differential Equations," SIAM, 20 pgs.

Baumstein, A. et al. (2009), "Scaling of the Objective Function Gradient for Full Wavefield Inversion," SEG Houston 2009 Int'l. Expo. & Annual Meeting, pp. 2243-2247.

Burstedde, C. et al. (2009), "Algorithmic strategies for full waveform inversion: 1D experiments," *Geophysics* 74(6), pp. WCC37-WCC46.

Lee, S. et al. (2010), "Subsurface parameter estimation in full wavefield inversion and reverse time migration," SEG Denver 2010 Annual Meeting, pp. 1065-1069.

Malmedy, W. et al. (2009), "Approximating Hessians in unconstrained optimization arising from discretized problems," *Computational Optimization and Applications*, pp. 1-16.

Martin, G.S. et al. (2006), "Marmousi2: An elastic upgrade for Marmousi," *The Leading Edge*, pp. 156-166.

Nocedal, J. et al. (2006)a "*Numerical Optimization, Chapt. 7—Large-Scale Unconstrained Optimization*," Springer, New York, 2nd Edition, pp. 165-176.

Sheen, D-H. et al. (2006), "Time domain Gauss-Newton seismic waveform inversion in elastic media," *Geophysics J. Int.* 167, pp. 1373-1384.

Tarantola, A. (1986), "A strategy for nonlinear elastic inversion of seismic reflection data," *Geophysics* 51(10), pp. 1893-1903.

Tarantola, A. (2005), "Inverse Problem Theory and Methods for Model Parameter Estimation," *SIAM*, p. 79.

Abt, D.L. et al. (2010), "North American lithospheric discontinuity structured imaged by Ps and Sp receiver functions,"*J. Geophys. Res.*, 24 pgs.

Akerberg, P., et al. (2008), "Simultaneous source separation by sparse radon transform," 78th Annual International Meeting, *SEG Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Beasley, C. (2008), "A new look at marine simultaneous sources," *The Leading Edge* 27(7), pp. 914-917.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

(56) References Cited

OTHER PUBLICATIONS

Becquey, M. et al. (2002), "Pseudo-Random Coded Simultaneous Vibroseismics," SEG Int'l. Exposition and 72th Annl. Mtg., 4 pgs.

Berkhout, A.J. (1987), "Applied Seismic Wave Theory," Elsevier Science Publishers, p. 142.

Berkhout, A.J. (1992), "Areal shot record technology," J. of Seismic Exploration 1, pp. 251-264.

Berkhout, A.J. (2008), "Changing the mindset in seismic data acquisition," The Leading Edge 27(7), pp. 924-938.

Ben-Hadj-Ali, H. et al. (2009), "Three-dimensional frequency-domain full waveform inversion with phase encoding," SEG Expanded Abstracts, pp. 2288-2292.

Bonomi, E. et al. (2006), "Wavefield Migration plus Monte Carlo Imaging of 3D Prestack Seismic Data," Geophysical Prospecting 54, pp. 505-514.

Boonyasiriwat, C. et al. (2010), "3D Multisource Full-Waveform Inversion Using Dynamic Random Phase Encoding," SEG Expanded Abstracts 29, pp. 1044-1049.

Boonyasirwat, C. et al. (2010), "3D Multi-source Least-squares reverse Time Migration," SEG Denver 2010 Annual Meeting, pp. 3120-3124.

Bunks, C., et al. (1995), "Multiscale seismic waveform inversion," Geophysics 60, pp. 1457-1473.

Chavent, G. et al. (1999), "An optimal true-amplitude least-squares prestack depth-migration operator," Geophysics 64(2), pp. 508-515.

Clapp, R.G. (2009), "Reverse time migration with random boundaries," SEG International Exposition and Meeting, Expanded Abstracts, pp. 2809-2813.

Dziewonski a. et al. (1981), "Preliminary Reference Earth Model," Phys. Earth Planet. Int. 25(4), pp. 297-356.

Ernst, F.E. et al. (2000), "Tomography of dispersive media," J. Acoust. Soc. Am 108(1), pp. 105-116.

Ernst, F.E. et al. (2002), "Removal of scattered guided waves from seismic data," Geophysics 67(4), pp. 1240-1248.

Esmersoy, C. (1990), "Inversion of P and SV waves from multicomponent offset vertical seismic profiles," Geophysics 55(1), pp. 39-50.

Fallat, M.R. et al. (1999), "Geoacoustic inversion via local, global, and hybrid algorithms," J. Acoust. So. Am. 105, pp. 3219-3230.

Fichtner, A. et al. (2006), "The adjoint method in seismology I. Theory," Physics of the Earth and Planetary Interiors 157, pp. 86-104.

Forbriger, T. (2003), "Inversion of shallow-seismic wavefields: I. Wavefield transformation," Geophys. J. Int. 153, pp. 719-734.

Gibson, B. et al. (1984), "Predictive deconvolution and the zero-phase source," Geophysics 49(4), pp. 379-397.

Griewank, A. (1992), "Achieving logarithmic growth of temporal and spatial complexity in reverse automatic differentiation," 1 Optimization Methods and Software, pp. 35-54.

Griewank, A. (2000), "Evaluating Derivatives: Principles and Techniques of Algorithmic Differentiation," Society for Industrial and Applied Mathematics, 49 pgs.

Griewank, A. et al. (2000), "Algorithm 799: An implementation of checkpointing for the reverse or adjoint mode of computational differentiation," 26 ACM Transactions on Mathematical Software, pp. 19-45.

Griewank, A. et al. (1996), "Algorithm 755: A package for the automatic differentiation of algorithms written in C/C++," ACM Transactions on Mathematical Software 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf, 20 pgs.

Herrmann, F.J. (2010), "Randomized dimensionality reduction for full-waveform inversion," EAGE abstract G001, 72nd EAGE Barcelona meeting, 5 pgs.

Holschneider, J. et al. (2005), "Characterization of dispersive surface waves using continuous wavelet transforms," Geophys. J. Int. 163, pp. 463-478.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," J. Acoust. Soc. Am. 89(1), pp. 171-181.

Jing, X. et al. (2000), "Encoding multiple shot gathers in prestack migration," SEG International Exposition and $70^{th}$ Annual Meeting, Expanded Abstracts, pp. 786-789.

Kennett, B.L.N. (1991), "The removal of free surface interactions from three-component seismograms," Geophys. J Int. 104, pp. 153-163.

Krebs, J.R. (2008), "Full-wavefield seismic inversion using encoded sources," Geophysics 74(6), pp. WCC177-WCC188.

Krohn, C.E. (1984), "Geophone ground coupling," Geophysics 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," Pure Applied Geophysics 165, pp. 255-270.

Levanon, N. (1988), "Radar Principles, Chpt. 1—Radar Measurements," John Whiley & Sons, New York, pp. 1-18.

Maharramov, M. et al. (2007), "Localized image-difference wave-equation tomography," SEG Annual Meeting, Expanded Abstracts, pp. 3009-3013.

Marcinkovich, C. et al. (2003), "On the implementation of perfectly matched layers in a three-dimensional fourth-order velocity-stress finite difference scheme," J. of Geophysical Research 108(B5), pp. 18-1-18-16.

Meier, M.A. et al. (2009), "Converted wave resolution," Geophysics 74(2), pp. Q1-Q16.

Mora, P. (1987), "Nonlinear two-dimensional elastic inversion of multi-offset seismic data," Geophysics 52, pp. 1211-1228.

Nazarian, S. et al. (1983), "Use of spectral analysis of surface waves method for determination of moduli and thickness of pavement systems," Transport Res. Record 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," SEG Expanded Abstracts, pp. 2107-2111.

Park, C.B. et al. (1999), "Multichannel analysis of surface waves," Geophysics 64(3), pp. 800-808.

Plessix, R.E. et al. (2004), "Frequency-domain finite-difference amplitude preserving migration," Geophys. J. Int. 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," Geophys. J. Int. 133, pp. 341-362.

Rayleigh, J.W.S. (1899), "On the transmission of light through an atmosphere containing small particles in suspension, and on the origin of the blue of the sky," Phil. Mag. 47. pp. 375-384.

Romero, L.A. et al. (2000), "Phase encoding of shot records in prestack migration," Geophysics 65, pp. 426-436.

Ryden, N. et al. (2006), "Fast simulated annealing inversion of surface waves on pavement using phase-velocity spectra," Geophysics 71(4), pp. R49-R58.

Schuster, G.T. (2010), "Theory of Multisource Crosstalk Reduction by Phase-Encoded Statics," SEG Denver 2010 Annual Meeting, pp. 3110-3114.

Sheriff, R.E. et al. (1982), "Exploration Seismology," pp. 134-135.

Shin, C. et al. (2001), "Waveform inversion using a logarithmic wavefield." Geophysics 49, pp. 592-606.

Sirgue, L. (2004), "Efficient waveform inversion and imaging: A strategy for selecting temporal frequencies," Geophysics 69, pp. 231-248.

Spitz, S. (2008), "Simultaneous source separation: a prediction-subtraction approach," 78th Annual Int'l. Meeting, SEG Expanded Abstracts, pp. 2811-2815.

(56) References Cited

OTHER PUBLICATIONS

Stefani, J. (2007), "Acquisition using simultaneous sources," 69th Annual Conf. and Exh.,*EAGE Extended Abstracts*, 5 pgs.

Symes, W.W. (2007), "Reverse time migration with optimal checkpointing," *Geophysics* 72(5), pp. SM213-SM221.

Tarantola, A. (1984), "Inversion of seismic reflection data in the acoustic approximation," *Geophysics* 49, pp. 1259-1266.

Tarantola, A. (1988), "Theoretical background for the inversion of seismic waveforms, including elasticity and attenuation," *Pure and Applied Geophysics* 128, pp. 365-399.

Trantham, E.C. (1994), "Controlled-phase acquisition and processing," *SEG Expanded Abstracts* 13, pp. 890-894.

van Manen, D.J. (2005), "Making wave by time reversal," SEG International Exposition and 75$^{th}$ Annual Meeting, Expanded Abstracts, pp. 1763-1766.

Verschuur, D.J. (2009), "Target-oriented, least-squares imaging of blended data," 79th Annual Int'l. Meeting, *SEG Expanded Abstracts*, pp. 2889-2893.

Vigh, D. et al. (2008), "3D prestack plane-wave, full-waveform inversion," *Geophysics* 73(5), pp. VE135-VE144.

Weglein, A.B. (2003), "Inverse scattering series and seismic exploration," *Inverse Problems* 19, pp. R27-R83.

Xia, J. et al. (2004), "Utilization of high-frequency Rayleigh waves in near-surface geophysics," *The Leading Edge*, pp. 753-759.

Ziolkowski, A. (1991), "Why don't we measure seismic signatures?," *Geophysics* 56(2), pp. 190-201.

Beylkin, G (1985), "Imaging of discontinuities in the inverse scattering problem by inversion of a casual generalized Radon transform," *J. Math. Phys.* 26(1), pp. 99-106.

Lecomte, I. (2008), "Resolution and illumination analyses in Psdm: a ray-based approach," *The Leading Edge*, pp. 650-663.

Park, C.B. et al. (2007), "Multichannel analysis of surface waves (MASW)—active and passive methods," *The Leading Edge*, pp. 60-64.

Zhang, Y. et al. (2005), "Delayed-shot 3D depth migration," *Geophysics* 70(5), pp. E21-E28.

\* cited by examiner

SIMULTANEOUS SOURCE ENCODING AND SOURCE SEPARATION AS A PRACTICAL SOLUTION FOR FULL WAVEFIELD INVERSION

CROSS REFERENCE TO RELATED APPLICATIONS

This application claims the benefit of U.S. Provisional Application 61/386,831 filed on Sep. 27, 2010, which is incorporated herein by reference in all jurisdictions that allow it. This application is related to that particular application entitled "Hybrid Method for Full Waveform Inversion Using Simultaneous and Sequential Source Method" and claiming the benefit of U.S. Provisional Application 61/386,828 filed on Sep. 27, 2010. This related application is also incorporated by reference herein in all jurisdictions that will allow it.

FIELD OF THE INVENTION

The invention relates generally to the field of geophysical prospecting, and more particularly to geophysical data processing. Specifically, the invention is a method for inversion of data acquired from multiple geophysical sources such as seismic sources, involving geophysical simulation that computes the data from many simultaneously-active geophysical sources in one execution of the simulation.

BACKGROUND OF THE INVENTION

Geophysical inversion [1,2] attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

Iterative inversion is generally preferred over non-iterative inversion, because it yields more accurate subsurface parameter models. Unfortunately, iterative inversion is so computationally expensive that it is impractical to apply it to many problems of interest. This high computational expense is the result of the fact that all inversion techniques require many compute intensive simulations. The compute time of any individual simulation is proportional to the number of sources to be inverted, and typically there are large numbers of sources in geophysical data, where the term source as used in the preceding refers to an activation location of a source apparatus. The problem is exacerbated for iterative inversion, because the number of simulations that must be computed is proportional to the number of iterations in the inversion, and the number of iterations required is typically on the order of hundreds to thousands.

The most commonly employed iterative inversion method employed in geophysics is cost function optimization. Cost function optimization involves iterative minimization or maximization of the value, with respect to the model M, of a cost function S(M) which is a measure of the misfit between the calculated and observed data (this is also sometimes referred to as the objective function), where the calculated data are simulated with a computer using the current geophysical properties model and the physics governing propagation of the source signal in a medium represented by a given geophysical properties model. The simulation computations may be done by any of several numerical methods including but not limited to finite difference, finite element or ray tracing. The simulation computations can be performed in either the frequency or time domain.

Cost function optimization methods are either local or global [3]. Global methods simply involve computing the cost function S(M) for a population of models $\{M_1, M_2, M_3, \ldots\}$ and selecting a set of one or more models from that population that approximately minimize S(M). If further improvement is desired this new selected set of models can then be used as a basis to generate a new population of models that can be again tested relative to the cost function S(M). For global methods each model in the test population can be considered to be an iteration, or at a higher level each set of populations tested can be considered an iteration. Well known global inversion methods include Monte Carlo, simulated annealing, genetic and evolution algorithms.

Unfortunately global optimization methods typically converge extremely slowly and therefore most geophysical inversions are based on local cost function optimization. Algorithm 1 summarizes local cost function optimization.

---

Algorithm 1 - Algorithm for performing local cost function optimization.

1. selecting a starting model,
2. computing the gradient of the cost function S(M) with respect to the parameters that describe the model,
3. searching for an updated model that is a perturbation of the starting model in the negative gradient direction that better explains the observed data.

---

This procedure is iterated by using the new updated model as the starting model for another gradient search. The process continues until an updated model is found that satisfactorily explains the observed data. Commonly used local cost function inversion methods include gradient search, conjugate gradients and Newton's method.

Local cost function optimization of seismic data in the acoustic approximation is a common geophysical inversion task, and is generally illustrative of other types of geophysical inversion. When inverting seismic data in the acoustic approximation the cost function can be written as:

$$S(M) = \sum_{g=1}^{N_g} \sum_{r=1}^{N_r} \sum_{t=1}^{N_t} W(\psi_{calc}(M, r, t, w_g) - \psi_{obs}(r, t, w_g)) \quad \text{(Eqn. 1)}$$

where:
S=cost function,
M=vector of N parameters, $(m_1, m_2, \ldots m_N)$ describing the subsurface model, g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=minimization criteria function (we usually choose $W(x)=x^2$ which is the least squares (L2) criteria),
$\psi_{calc}$=calculated seismic pressure data from the model M,
$\psi_{obs}$=measured seismic pressure data.

The gathers can be any type of gather that can be simulated in one run of a seismic forward modeling program. Usually the gathers correspond to a seismic shot, although the shots can be more general than point sources. For point sources the gather index g corresponds to the location of individual point sources. For plane wave sources g would correspond to different plane wave propagation directions. This generalized source data, $\psi_{obs}$, can either be acquired in the field or can be synthesized from data acquired using point sources. The calculated data $\psi_{calc}$ on the other hand can usually be computed directly by using a generalized source function when forward modeling. For many types of forward modeling, including finite difference modeling, the computation time needed for a generalized source is roughly equal to the computation time needed for a point source.

Equation (1) can be simplified to:

$$S(M) = \sum_{g=1}^{N_g} W(\delta(M, w_g)) \qquad \text{(Eqn. 2)}$$

where the sum over receivers and time samples is now implied and, $$\delta(M,w_g)=\psi_{calc}(M,w_g)-\psi_{obs}(w_g) \qquad \text{(Eqn. 3)}$$

Inversion attempts to update the model M such that S(M) is a minimum. This can be accomplished by local cost function optimization which updates the given model $M^{(k)}$ as follows:

$$M^{(k+1)}=M^{(k)}-\alpha^{(k)}\nabla_M S(M) \qquad \text{(Eqn. 4)}$$

where k is the iteration number, $\alpha$ is the scalar size of the model update, and $\nabla_M S(M)$ is the gradient of the misfit function, taken with respect to the model parameters. The model perturbations, or the values by which the model is updated, are calculated by multiplication of the gradient of the objective function with a step length $\alpha$, which must be repeatedly calculated.

From equation (2), the following equation can be derived for the gradient of the cost function:

$$\nabla_M S(M) = \sum_{g=1}^{N_g} \nabla_M W(\delta(M, w_g)). \qquad \text{(Eqn. 5)}$$

So to compute the gradient of the cost function one must separately compute the gradient of each gather's contribution to the cost function, then sum those contributions. Therefore, the computational effort required for computing $\nabla_M S(M)$ is $N_g$ times the compute effort required to determine the contribution of a single gather to the gradient. For geophysical problems, $N_g$ usually corresponds to the number of geophysical sources and is on the order of 10,000 to 100,000, greatly magnifying the cost of computing $\nabla_M S(M)$.

Note that computation of $\nabla_M W(\delta)$ requires computation of the derivative of $W(\delta)$ with respect to each of the N model parameters $m_i$. Since for geophysical problems N is usually very large (usually more that one million), this computation can be extremely time consuming if it had to be performed for each individual model parameter. Fortunately, the adjoint method can be used to efficiently perform this computation for all model parameters at once [1]. The adjoint method for the least squares objective function and a gridded model parameterization is summarized by the following algorithm:

---

Algorithm 2 - Algorithm for computing the least-squares cost-function gradient of a gridded model using the adjoint method.

---

1. Compute forward simulation of the data using the current model and the gather signature $w_g$ as the source to get $\psi_{calc}(M^{(k)},w_g)$,
2. Subtract the observed data from the simulated data giving $\delta(M^{(k)},w_g)$,
3. Compute the reverse simulation (i.e. backwards in time) using $\delta(M^{(k)},w_g)$ as the source producing $\psi_{adjoint}(M^{(k)},w_g)$,
4. Compute the integral over time of the product of $\psi_{calc}(M^{(k)},w_g)$ and $\psi_{adjoint}(M^{(k)},w_g)$ to get $\nabla_M W(\delta(M,w_g))$.

---

While computation of the gradients using the adjoint method is efficient relative to other methods, it is still very costly. In particular the adjoint methods requires two simulations, one forward in time and one backward in time, and for geophysical problems these simulations are usually very compute intensive. Also, as discussed above, this adjoint method computation must be performed for each measured data gather individually, increasing the compute cost by a factor of $N_g$.

The compute cost of all categories of inversion can be reduced by inverting data from combinations of the sources, rather than inverting the sources individually. This may be called simultaneous source inversion. Several types of source combination are known including: coherently sum closely spaced sources to produce an effective source that produces a wavefront of some desired shape (e.g. a plane wave), sum widely spaces sources, or fully or partially stacking the data before inversion.

The compute cost reduction gained by inverting combined sources is at least partly offset by the fact that inversion of the combined data usually produces a less accurate inverted model. This loss in accuracy is due to the fact that information is lost when the individual sources are summed, and therefore the summed data does not constrain the inverted model as strongly as the unsummed data. This loss of information during summation can be minimized by encoding each shot record before summing. Encoding before combination preserves significantly more information in the simultaneous source data, and therefore better constrains the inversion [5]. Encoding also allows combination of closely spaced sources, thus allowing more sources to be combined for a given computational region. Various encoding schemes can be used with this technique including time shift encoding and random phase encoding. The remainder of this Background section briefly reviews various published geophysical simultaneous source techniques, both encoded and non-encoded.

Van Manen [6] suggests using the seismic interferometry method to speed up forward simulation. Seismic interferometry works by placing sources everywhere on the boundary of the region of interest. These sources are modeled individually and the wavefield at all locations for which a Green's function is desired is recorded. The Green's function between any two recorded locations can then be computed by cross-correlating the traces acquired at the two recorded locations and summing over all the boundary sources. If the data to be inverted have a large number of sources and receivers that are within the region of interest (as opposed to having one or the other on the boundary), then this is a very efficient method for computing the desired Green's functions. However, for the seismic data case it is rare that both the source and receiver for the data to be inverted are within the region of interest. Therefore, this improvement has very limited applicability to the seismic inversion problem.

Berkhout [7] and Zhang [8] suggest that inversion in general can be improved by inverting non-encoded simultaneous sources that are summed coherently to produce some desired wave front within some region of the subsurface. For example, point source data could be summed with time shifts that are a linear function of the source location to produce a down-going plane wave at some particular angle with respect to the surface. This technique could be applied to all categories of inversion. A problem with this method is that coherent summation of the source gathers necessarily reduces the amount of information in the data. So for example, summation to produce a plane wave removes all the information in the seismic data related to travel time versus source-receiver offset. This information is critical for updating the slowly varying background velocity model, and therefore Berkhout's method is not well constrained. To overcome this problem many different coherent sums of the data (e.g. many plane waves with different propagation directions) could be inverted, but then efficiency is lost since the cost of inversion is proportional to the number of different sums inverted. Herein, such coherently summed sources are called generalized sources. Therefore, a generalized source can either be a point source or a sum of point sources that produces a wave front of some desired shape.

Van Riel [9] suggests inversion by non-encoded stacking or partial stacking (with respect to source-receiver offset) of the input seismic data, then defining a cost function with respect to this stacked data which will be optimized. Thus, this publication suggests improving cost function based inversion using non-encoded simultaneous sources. As was true of the Berkhout's [7] simultaneous source inversion method, the stacking suggested by this method reduces the amount of information in the data to be inverted and therefore the inversion is less well constrained than it would have been with the original data.

Mora [10] proposes inverting data that is the sum of widely spaced sources. Thus, this publication suggests improving the efficiency of inversion using non-encoded simultaneous source simulation. Summing widely spaced sources has the advantage of preserving much more information than the coherent sum proposed by Berkhout. However, summation of widely spaced sources implies that the aperture (model region inverted) that must be used in the inversion must be increased to accommodate all the widely spaced sources. Since the compute time is proportional to the area of this aperture, Mora's method does not produce as much efficiency gain as could be achieved if the summed sources were near each other.

Ober [11] suggests speeding up seismic migration, a special case of non-iterative inversion, by using simultaneous encoded sources. After testing various coding methods, Ober found that the resulting migrated images had significantly reduced signal-to-noise ratio due to the fact that broad band encoding functions are necessarily only approximately orthogonal. Thus, when summing more than 16 shots, the quality of the inversion was not satisfactory. Since non-iterative inversion is not very costly to begin with, and since high signal-to-noise ratio inversion is desired, this technique is not widely practiced in the geophysical industry.

Ikelle [12] suggests a method for fast forward simulation by simultaneously simulating point sources that are activated (in the simulation) at varying time intervals. A method is also discussed for decoding these time-shifted simultaneous-source simulated data back into the separate simulations that would have been obtained from the individual point sources. These decoded data could then be used as part of any conventional inversion procedure. A problem with Ikelle's method is that the proposed decoding method will produce separated data having noise levels proportional to the difference between data from adjacent sources. This noise will become significant for subsurface models that are not laterally constant, for example from models containing dipping reflectors. Furthermore, this noise will grow in proportion to the number of simultaneous sources. Due to these difficulties, Ikelle's simultaneous source approach may result in unacceptable levels of noise if used in inverting a subsurface that is not laterally constant.

Simultaneous inversion of multiple encoded sources is proposed by Krebs et al. in PCT Patent Application Publication No. WO 2008/042081 [5, 18], which is incorporated herein by reference in all jurisdictions that allow it, is a very cost effective method to invert full wave field data. (The same approach of simultaneous inversion of an encoded gather will work for receivers, either via source-receiver reciprocity or by encoding the actual receiver locations in common-source gathers of data.) For fixed receivers, the forward and adjoint computations only need to be performed for a single effective source; see PCT Patent Application Publication No. WO 2009/117174, which is incorporated herein by reference in all jurisdictions that allow it. Given the fact that hundreds of shots are recorded for typical 2D acquisition geometries, and thousands in the case of 3D surveys, computational savings from this method are quite significant. In practice, a fixed receiver assumption is not strictly valid for most common field data acquisition geometries. In the case of marine streamer data, both sources and receivers move for every new shot. Even in surveys where the locations of receivers are fixed, the practice often is that not all receivers are "listening" to every shot, and the receivers that are listening can vary from shot-to-shot. This also violates the "fixed-receiver assumption." In addition, due to logistical problems, it is difficult to record data close to the source, and this means that near-offset data are typically missing. This is true for both marine and land surveys. Both of these factors mean that for a simultaneous source gather, every receiver location will be missing data for some source shots. In summary, in simultaneous encoded-source inversion, for a given simultaneous encoded gather, data are required at all receiver locations for every shot, and this may be referred to as the fixed-receiver assumption of simultaneous encoded-source inversion. In WO 08/042,081, some of the disclosed embodiments may work better than others when the fixed-receiver assumption is not satisfied. Therefore, it would be advantageous to have an accommodation or adjustment to straightforward application of simultaneous encoded sources (and/or receivers) inversion that would enhance its performance when the fixed receiver assumption is compromised. The present invention provides ways of doing this. Haber et al. [25] also describe an approach to the problem of moving receivers in simultaneous encoded source inversion using a stochastic optimization method, and apply it to a direct current resistivity problem.

SUMMARY OF THE INVENTION

In a broad embodiment, the invention is a computer-implemented method for simultaneous inversion of measured geophysical data from multiple encoded sources to determine a physical properties model for a subsurface region, the measured geophysical data resulting from a survey for which the fixed-receiver assumption of simultaneous encoded-source inversion may not be valid, said method comprising using a computer to perform simultaneous source separation to lessen any effect of the measured geophysical data's not satisfying the fixed-receiver assumption, wherein a data processing step coming after a simultaneous source separation acts to conform model simulated data to the measured geophysical data for source and receiver combinations that are missing in the measured geophysical data.

In a more specific embodiment, the invention is a computer-implemented method for full-wavefield inversion of measured geophysical data to determine a physical properties model for a subsurface region, said method using a computer to perform steps comprising: (a) constructing an initial physical properties model and using it to simulate synthetic data corresponding to the measured geophysical data, wherein sources and/or receivers in the simulation are encoded and simulated simultaneously, thereby generating simulated encoded data; (b) separating the simulated encoded data according to source, resulting in simulated sequential-source data; (c) processing the simulated sequential-source data to make them conform to the measured geophysical data for source and receiver combinations that are missing in the measured geophysical data; (d) computing differences, called data residuals, between the processed simulated sequential source data and the measured geophysical data for source and receiver combinations that are present in the measured geophysical data; (e) encoding the data residuals, using the same encoding as was used in (a) or different encoding; (f) using the encoded data residuals to compute an update to the initial physical properties model; and (g) combining the update with the initial model to form an updated physical properties model. Due to linearity, the order of the steps (d) and (e) may be interchanged.

In a variation on this last embodiment, the following steps may be performed at any time before the computing differences step (c): encoding the measured geophysical data, using the same or different source encoding as was used in generating the simulated encoded data; then separating the encoded measured data according to source, preferably using the same source separation algorithm that was used in separating the simulated encoded data according to source; and using the separated measured data in computing the data residuals.

In a second more specific embodiment, the present invention is a computer-implemented method for full-wavefield inversion of measured geophysical data to determine a physical properties model for a subsurface region, said method using a computer to perform steps comprising: (a) constructing an initial physical properties model and using it to simulate synthetic data corresponding to the measured geophysical data, wherein sources and/or receivers in the simulation are encoded using selected encoding functions and simulated simultaneously, thereby generating simulated encoded data; (b) separating the simulated encoded data according to source and/or receiver using a source or receiver separation algorithm, resulting in simulated sequential source and/or receiver data; (c) processing the simulated sequential source and/or receiver data to mute those data, referred to as the missing data, corresponding to source and receiver combinations that are missing; (d) encoding the missing data, using encoding functions that are the same or different than said selected encoding functions; (e) encoding the measured geophysical data using encoding functions that are the same as those used in encoding the missing data, and subtracting them, according to source and receiver position, from the simulated encoded data, thereby generating encoded data residuals, which will be incorrect due to the missing source and receiver combinations in the measured geophysical data; (f) subtracting the encoded missing data from the encoded data residuals to generate corrected encoded data residuals; (g) using the corrected encoded data residuals to compute an update to the initial physical properties model; and (h) combining the update with the initial model to form an updated physical properties model.

In a third more specific embodiment, the present invention is a computer-implemented method for full-wavefield inversion of measured geophysical data to determine a physical properties model for a subsurface region, said method using a computer to perform steps comprising: (a) constructing an initial physical properties model and using it to simulate synthetic data corresponding to the measured geophysical data, wherein sources and/or receivers in the simulation are encoded, using selected encoding functions, and simulated simultaneously, thereby generating simulated encoded data; (b) using said selected encoding functions to encode the measured geophysical data and subtracting them, according to source and receiver position, from the simulated encoded data, thereby generating encoded data residuals, which will include incorrect values due to the missing source and receiver combinations in the measured geophysical data; (c) separating the encoded data residuals according to source and/or receiver using a source or receiver separation algorithm, resulting in sequential residual data; (d) processing the sequential residual data to estimate simulated data, referred to as missing data, corresponding to source and receiver combinations that are missing in the measured geophysical data; (e) encoding the missing data, using said selected encoding functions; (f) subtracting the encoded missing data from the encoded data residuals to generate corrected encoded data residuals; (g) using the corrected encoded data residuals to compute an update to the initial physical properties model; and (h) combining the update with the initial model to form an updated physical properties model.

BRIEF DESCRIPTION OF THE DRAWINGS

The patent or application file contains at least one drawing executed in color. Copies of this patent or patent application publication with color drawings will be provided by the Office upon request and payment of the necessary fees.

The present invention and its advantages will be better understood by referring to the following detailed description and the attached drawings in which.

Figure 1:
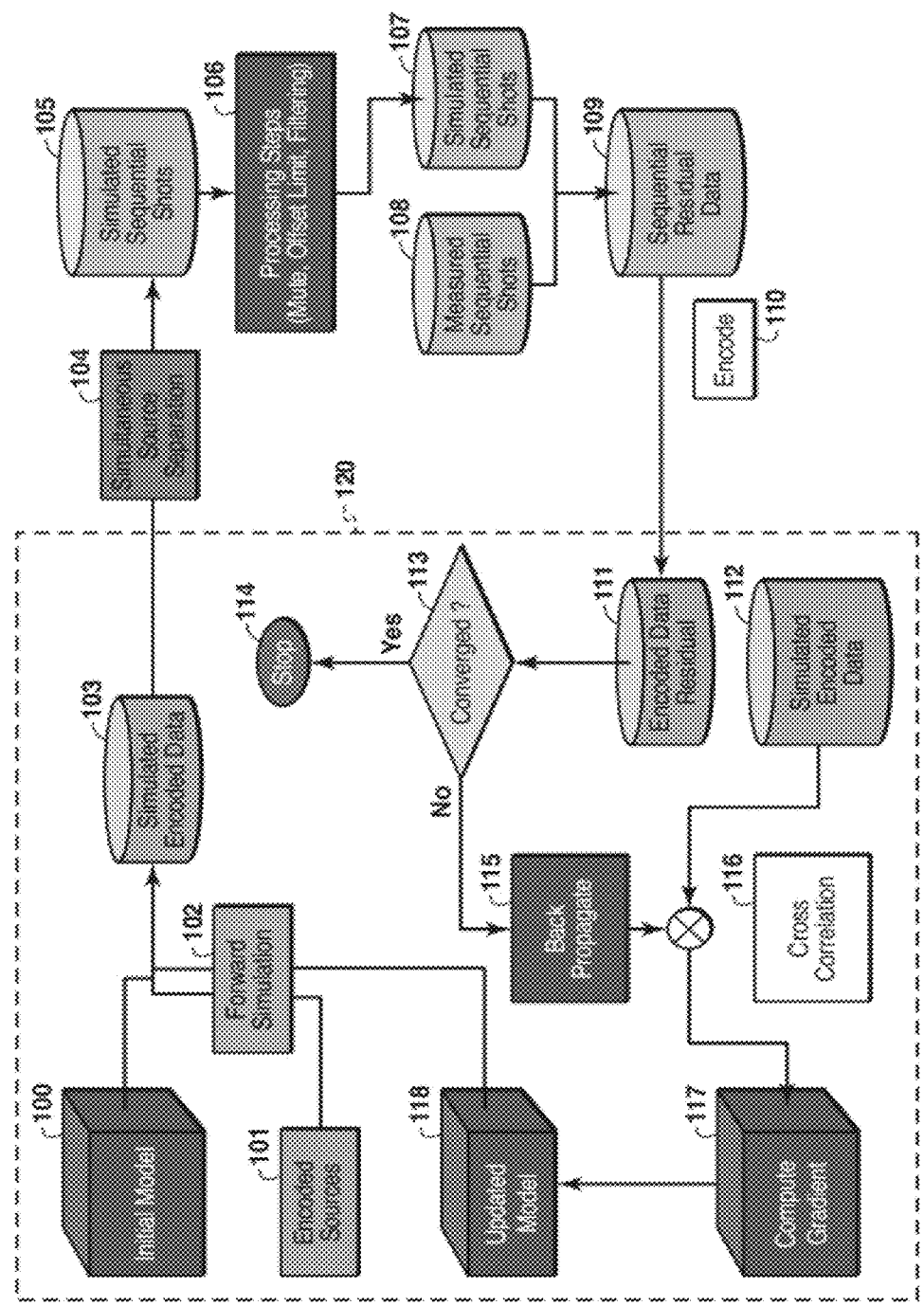
FIG. 1 is a flowchart showing basic steps in the present inventive method for simultaneous source inversion for a non-fixed receiver geometry problem in an embodiment in which the encoded predicted data are separated using a source separation method.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present inventive method uses source encoding and decoding (i.e. source separation) to circumvent the fixed receiver assumption and is applicable for marine streamer as well as land acquisition geometry. In a typical marine streamer and land acquisition, the data coverage is often insufficient to satisfy the fixed receiver geometry thus limiting the benefits of simultaneous source full wave inversion ("FWI") proposed by Krebs at. al [5,18]. In addition to geometry considerations, the field data need to be processed to conform to the physics of the forward simulation used in the inversion. For example, to use acoustic inversion for inverting elastic data, far offsets are typically muted and the data are processed to remove other elastic effects. Other practical aspects such as event (reflections, refractions, multiples) based windowing for FWI inversion must assume fixed receiver geometry, an assumption often not satisfied in practice.

Most of the work using encoding and decoding has been focused on processing and imaging (migration algorithms) of seismic data (Ikelle [17], Berkhout [16], Beasley et al. [26], Stefani et al. [22], Verschuur and Berkhout [23]). Some of the published work on inversion is by Krebs et al. [5,18], Hinkley [4], Ben-Hadj-Ali et al. [15] and Herrmann [24] for inverting full waveform data. A main idea of the present invention is to utilize the power of simultaneous sources (and/or receivers) encoding for the forward modeling, back propagation and inversion process but at the same time be able to handle practical aspects of data limitation commonly encountered in field surveys (both land and marine).

Krebs et al. [5,16] show that the encoded simultaneous source cost function can be computed more efficiently than conventional cost functions while still providing accurate inversions. The simultaneous source cost function is defined here as (compare with equation (2) above):

$$S_{sim}(M) = \sum_{G=1}^{N_G} W\left(\delta\left(M, \sum_{g \in G} c_g \otimes w_g\right)\right) \quad \text{(Eqn. 6)}$$

where a summation over receivers and time samples is implied as in Eqn. (2), and:

$$\sum_{g=1}^{N_g} = \sum_{G=1}^{N_G} \sum_{g \in G} \text{ defines a sum over gathers by sub groups of gathers,}$$

$S_{sim}$=cost function for simultaneous source data,
G=the groups of simultaneous generalized sources, and
$N_G$=the number of groups, $c_g$=functions of time that are convolved ($\otimes$) with each gather's source signature to encode the gathers, these encoding functions may be chosen to be approximately orthogonal with respect to some appropriate operation depending on the weighting function W. When W is the L2-Norm the appropriate operation is cross-correlation.

The outer summation in Eqn. (6) is over groups of simultaneous generalized sources corresponding to the gather type (e.g. points sources for common shot gathers). The inner summation, over g, is over the gathers that are grouped for simultaneous computation. For some forward modeling methods, such as finite difference modeling, the computation of the forward model for summed generalized sources (the inner sum over g∈G) can be performed in the same amount of time as the computation for a single source. Therefore, as shown in Krebs et. al. [5] $\delta(M, \Sigma c_g \otimes w_g)$ can be computed very efficiently using Algorithm 3.

---

Algorithm 3 - Algorithm for computing the encoded simultaneous-source data residual. [NOTE: To compute the cost function, the residual needs to be evaluated with the function W; for example, least squares.]

1. Simulate $\psi_{calc}(M, \Sigma c_g \otimes w_g)$ using a single run of the simulator using $\Sigma c_g \otimes w_g$ as the source,
2. Convolve each measured data gather with the $c_g$ encoding functions, then sum the resulting encoded gathers (i.e. $\Sigma c_g \otimes \psi_{obs}(w_g)$),
3. Subtract the result of step 2 from the result of step 1.

---

Again as shown in Krebs et al. [5] this algorithm can compute $S_{sim}(M)$ a factor of $N_g/N_G$ times faster than S(M) from Eqn. (2).

Many types of encoding functions $c_g$ can be used in equation (6) including but not limited to:

Linear, random, chirp and modified-chirp frequency-dependent phase encoding as presented in Romero et al. [13];

The frequency independent phase encoding as presented in Jing et al. [14];

Random time shift encoding;

Frequency division multiplexing (FDMA), time division multiplexing (TDMA) and code division multiplexing (CDMA) used in telecommunications.

Some of these encoding techniques will work better than others depending upon the application, and some can be combined. In particular, good results have been obtained using frequency dependent random phase encoding and also by combining frequency independent encoding of nearby sources with frequency dependent random phase encoding for more widely separated sources. An indication of the relative merits of different encodings can be obtained by running test inversions with each set of encoding functions to determine which converges faster.

It should be noted that the simultaneous encoded-source technique can be used for many types of inversion cost function. In particular, it could be used for cost functions based on other norms than L2 discussed above. It could also be used on more sophisticated cost functions than the one presented in Equation 2, including regularized cost functions. Finally, the simultaneous encoded-source method could be used with any type of global or local cost function inversion method including Monte Carlo, simulated annealing, genetic algorithm, evolution algorithm, gradient line search, conjugate gradients and Newton's method.

The present inventive method can also be used in conjunction with various types of generalized source techniques, such as those suggested by Berkhout [7]. In this case, rather than encoding different point source gather signatures, one would encode the signatures for different synthesized plane waves.

Some variations on the embodiment described above include:

- The $c_g$ encoding functions can be changed for each iteration of the inversion. In at least some instances this leads to faster convergence of the inversion.
- In some cases (e.g., when the source sampling is denser than the receiver sampling) it may be advantageous to use reciprocity to treat the actual receivers as computational sources, and encode the receivers instead of the sources.
- This invention is not limited to single-component point receivers. For example, the receivers could be receiver arrays or they could be multi-component receivers.
- The method may be improved by optimizing the encoding to yield the highest quality inversion. For example the encoding functions could be optimized to reduce the number of local minima in the cost function. The encoding functions could be optimized either by manual inspection of tests performed using different encoding functions or using an automated optimization procedure.
- Acquisition of simultaneous encoded-source data could result in significant geophysical data acquisition cost savings.
- For marine seismic data surveys, it would be very efficient to acquire encoded source data from multiple simultaneously operating marine vibrators that operate continuously while in motion.
- As indicated above, the encoding process in the present invention may be performed in the field acquisition of the data, for example where the pilot signals of multiple simultaneously operating vibrators are encoded with different encoding functions. In the attached claims, steps referring to encoding geophysical data, or to geophysical data from encoded sources, or to obtaining encoded gathers of geophysical data will be understood to include obtaining data already encoded in the field acquisition process, except where the context clearly indicates that encoding is occurring in a data processing step.
- Other definitions for the cost function may be used, including the use of a different norm (e.g. L1 norm (absolute value) instead of L2 norm), and additional terms to regularize and stabilize the inversion (e.g. terms that would penalize models that aren't smooth or models that are not sparse).

A main idea of the present invention is to use simultaneous source encoding and simultaneous source separation for full waveform inversion in such a way as to lessen the impact when the fixed receiver assumption is compromised, and thereby make simultaneous source FWI more applicable to general data geometries. FIG. 1 shows basic steps in one embodiment of the present inventive method. Following the flow chart shown in FIG. 1, the steps are given next. The discussion that follows will be in terms of encoded sources; however, alternatively the receivers may be encoded instead of or in addition to the sources.

1. For a given physical properties model of the subsurface (100), the survey sources (i.e., source locations) are encoded to form a simultaneous encoded source (101) which is used in the forward modeling, or simulation, (102) to generate simulated encoded data (103). The encoded data are generated assuming fixed receiver geometry with all receivers being live for the encoded source.

2. Since the field data typically violate fixed receiver geometry to at least some extent, the encoded data are separated into individual shots using a source separation technique (104) such as that described by Neelamani et al. [19,20,21]. Neelamani's source separation relies on the assumption that the Green's function of the model has sparse representation in a transform domain such as a curvelet or wavelet domain. With the knowledge of the encoding scheme and assuming sparsity of Green's function, the shots can be separated using for example L1 norm inversion in the transformed domain. This separation problem can be solved for single encoded shot data for the whole model domain, or it can be applied to multiple sets of encoded shot data. Persons who work in the technical field will know of a variety of source separation techniques that can be used as an alternative to that of Neelamani et al. [19,20,21]. For example, Spitz et al. [28] proposed a prediction-subtraction approach which first estimates the primary wavefield of the second source and then subtracts it from the total wavefield via a PEF-based adaptive subtraction. Akerberg et al. [27] used sparse Radon transforms for the source separation. For all source separation algorithms, more than one encoded dataset is preferable.

3. The source separation described in the previous step is crucial to handle practical data geometries. With the separated shots (105), whatever processing steps that may be necessary may be applied (106) so that the simulated data conform to the field data. Thus, with the separated shots, the data can be processed to conform to the field data acquisition geometry such as offset muting, i.e. removing the near and far-offsets, muting based on type of arrivals such as transmission versus reflection component of data, or removing the elastic component of the data if the governing forward engine is based on an acoustic assumption. Therefore, this general step of data processing with the separated shots to make the predicted data (107) similar to the measured data geometry (108) as well as make the data conform to the level of the physics allows production of sequential data residuals (109), i.e. data residuals for selected shots gathers. A data residual is a measure of the difference between a measured data value and a corresponding predicted data value.

4. These data residuals, which are sequential data residuals (109) by virtue of the source separation step 104, are encoded (110) using the same or different encoding scheme as used in step 101 to produce encoded data residuals (111). This is a significant step since the gaps in the data due to acquisition geometry or due to user choice of specific events in the data are now in these encoded data residuals (111). Next, the encoded data residuals are used to compute the gradient of the objective function (117). For example, the residuals may be back-propagated (115) using the adjoint state equation and cross-correlated (116) with the forward-propagated data (112) from 103 using the simultaneous source to calculate the gradient of the objective function to be minimized as described in PCT Patent Application Publication No. WO 2009/117174. Note that the simulated encoded data 112 may, but do not have to be, the same as the simulated encoded data 103, because they may be encoded with different encoding functions; however the encoding in 112 must match the encoding in 111.

5. In the final step, the model is updated (118) using the computed gradient from the previous step. A variety of well known optimization methods, such as steepest descent, conjugate gradients, or Newton's method can be used to do the model updating to ensure that the value of the objective function decreases. The simultaneous source inversion algorithm represented by the steps within dashed line box 120 is based on WO 2009/117174, but any inversion or forward modeling (manual adjustment) algorithm may be used.

For processing and imaging, the accuracy of the source separation is important, since any artifact arising due to source separation process eventually is mapped into the final image. In previous similar work where source separation is used, considerable effort is made to choose the type of encoding to ensure improved accuracy of separation (Ikelle [17]). It is believed that the accuracy requirement will be relaxed for the inversion application of this invention since the small inaccuracies in the data residuals due to source separation can be handled via a line search and model regularization process during the inversion step. For inversion applications, a key is to make the predicted data that are subtracted from measured data conform to the acquisition geometry and adhere to the level of the physics being applied (for example, muting the large offsets when anisotropic effects are present in the data and the forward simulation algorithm assumes an isotropic earth model). Having achieved that via processing the separated shots removes the large errors in the data residuals.

Figure 2:
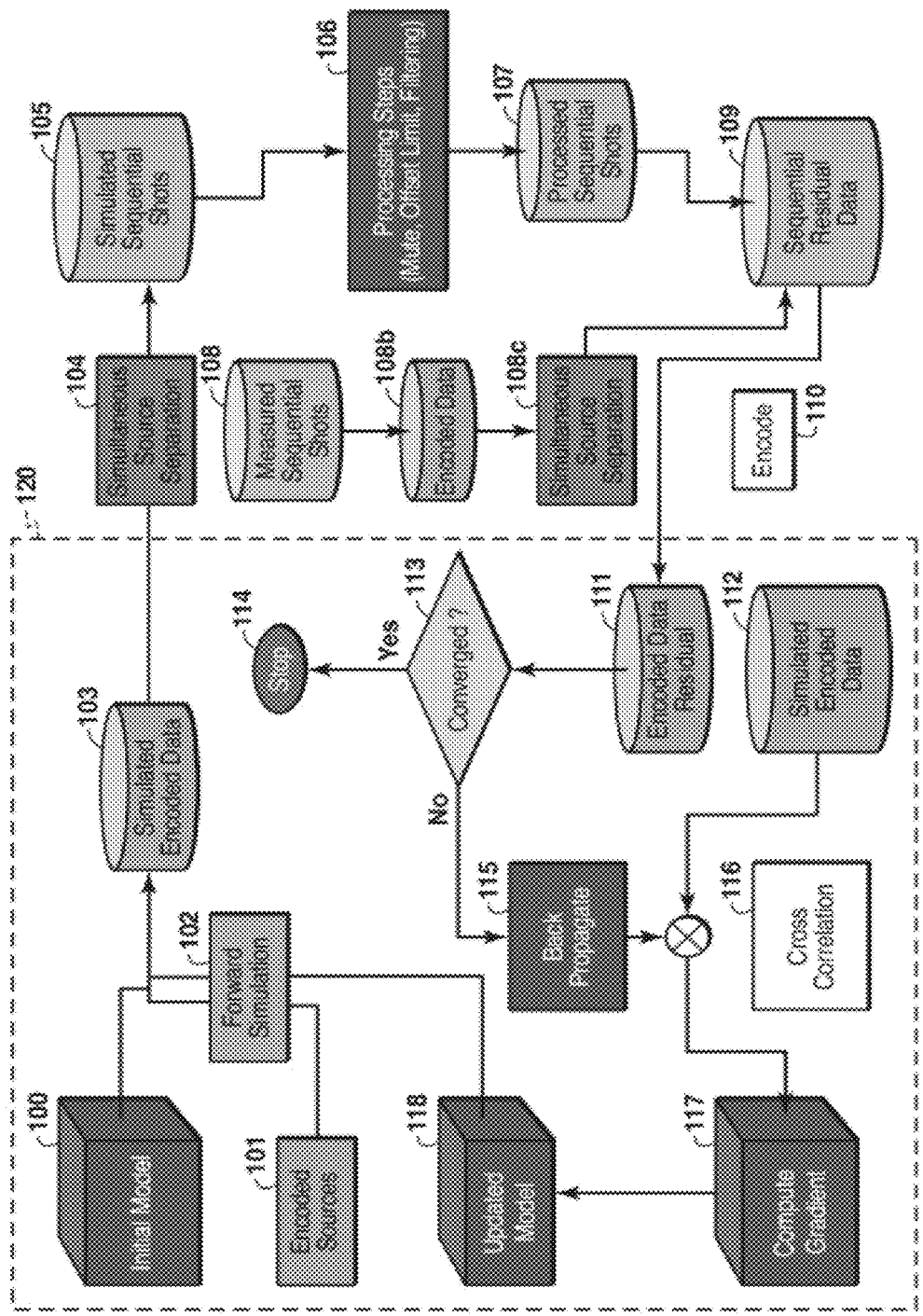
FIG. 2 is a flowchart showing basic steps in the present inventive method for simultaneous source inversion for a non-fixed receiver geometry problem in an embodiment in which the encoded predicted data as well as encoded measured data are separated using a source separation method to reduce error in the source separation process.

Although it is believed that the small inaccuracies in source separation can be handled in the inversion process, large errors can still be a problem. Therefore, an alternative embodiment of the present inventive method is designed to handle the large errors due to source separation, and may be used when this is believed to be a problem. An example of this alternative embodiment is illustrated by the flowchart of FIG. 2. To replicate the errors due to separation, the measured data are encoded (108*b*) using the same encoding scheme and using source separation (108*c*) to obtain measured separated shot gathers. These measured separated shot gathers can be used to compute the data residuals instead of the original measured shots.

Another way to view this problem is to determine encoded data residuals that are corrected for the missing far and near offsets traces. So, another alternative can be described as follows, shown in FIG. 3. First, the data residual (309) that is a difference between simulated encoded data (103) and the encoded measured data (308) with missing far and near offsets is formed (i.e., simulated encoded minus encoded measured). This data residual (309) is unsuitable for computing the gradient since the simulated encoded data (103) has contribution from the missing part of the data (e.g., near and far offset traces) whereas the measured encoded data (308) do not have a contribution from missing data. In the next step (304), source separation of the simulated encoded data is performed, and the resulting estimate of simulated sequential shots (305) are processed, but instead of removing the missing data part (such as muting out the near and far offsets from the separated shot gathers (306)), the missing part (such as near and far offsets) of the shot gathers (307) is encoded. This encoded missing part of the data (307) can be subtracted (310) from the incorrect data residual (309) to compensate for the missing data information and obtain a corrected data residual (311). (It is subtracted, rather than added, because it needs to offset simulated encoded data which are present in the incorrect data residual with a positive sign, since the residual is defined—see above—as simulated encoded data minus encoded measured data. If that definition, which is arbitrary, were reversed, then the missing data would be added to the residual. Moreover, instead of treating the missing-data correction as a subtraction from the simulated data contribution to the data residual, it could be regarded as an addition to the measured data contribution to the data residual. It will be understood that the present invention, including be appended claims, includes all such equivalent approaches.) The key difference of this embodiment compared to that described in FIG. 1 is encoded data residuals are corrected in this embodiment rather than being generated after processing as shown in FIG. 1. If the source separation is perfect, then the two approaches (FIG. 1 and FIG. 3) are mathematically equivalent; however, in the presence of source separation errors, it is possible that the correction approach shown in FIG. 3 may provide a better result.

Figure 3:
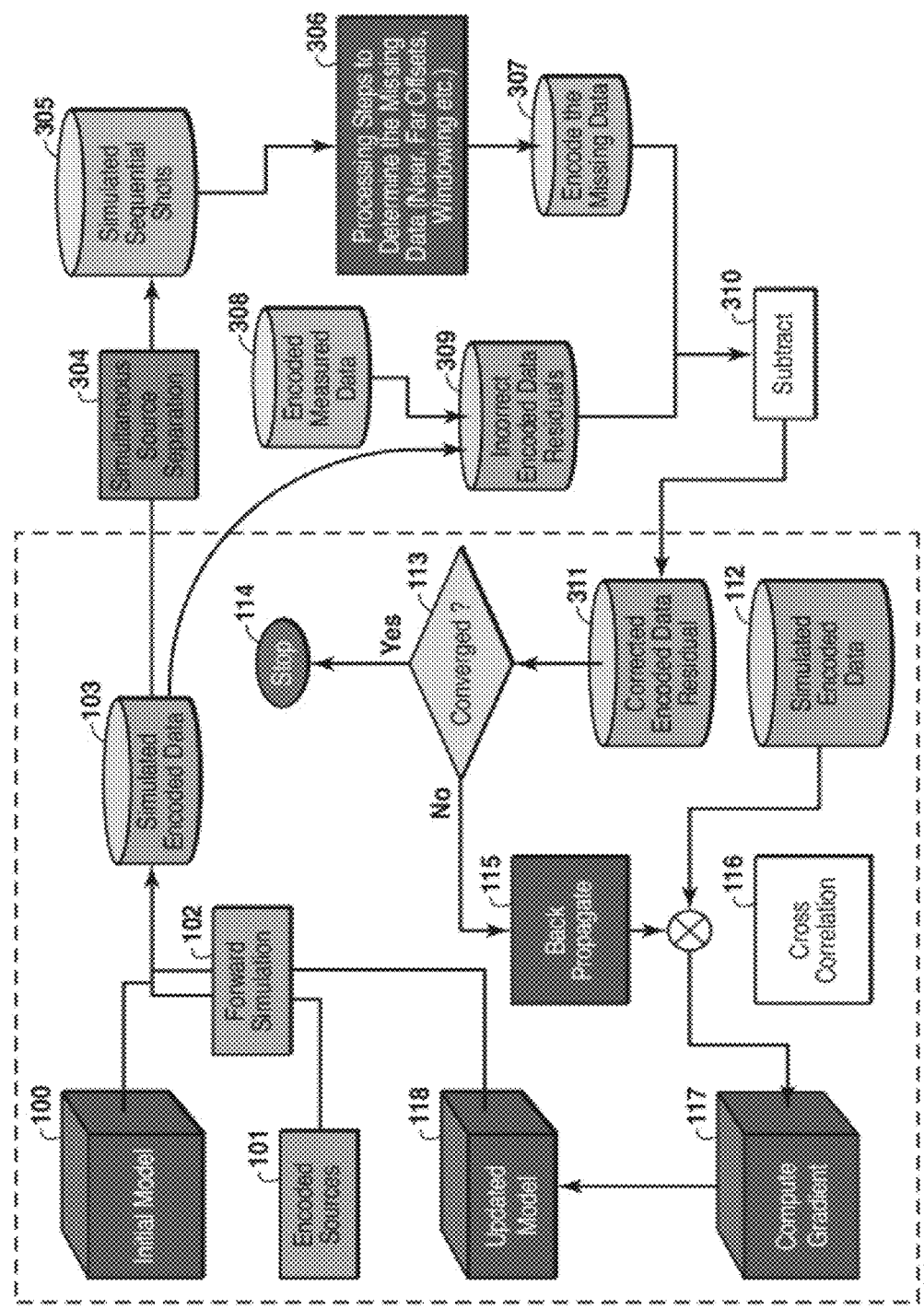
FIGS. 3 and 4 are flowcharts showing basic steps in the present inventive method for simultaneous source inversion for a non-fixed receiver geometry problem in two embodiments in which the incorrect encoded data residuals are corrected by the encoded part of the missing data obtained from a source separation method.
Figure 4:
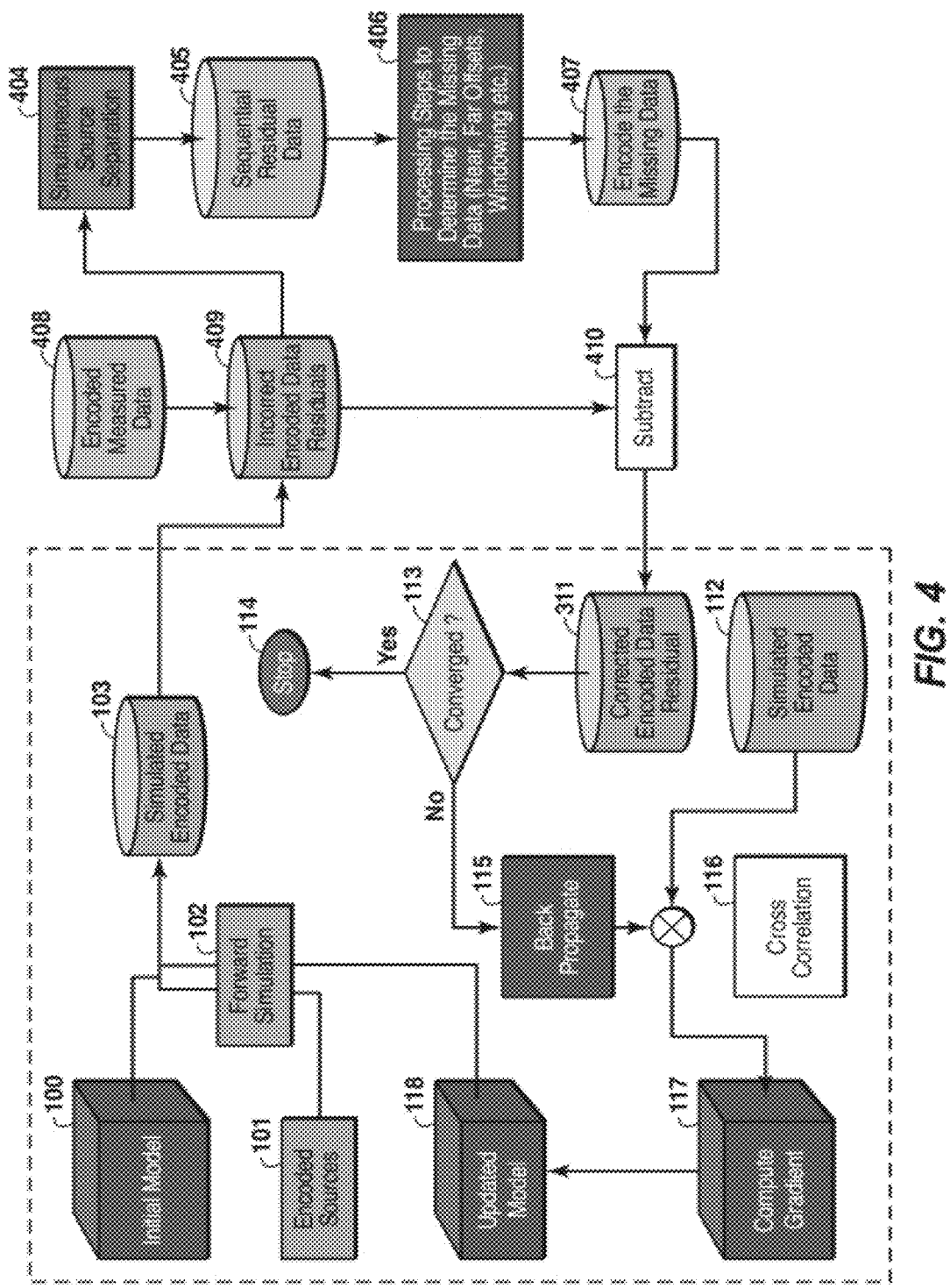

FIG. 4 describes an alternative to the data residual correction method described FIG. 3. Similar to the method in FIG. 3, first, the encoded data residual (409) that is a difference between simulated encoded data (103) and the encoded measured data (408) with missing far and near offsets is formed. In the next step, source separation (404) is performed using the encoded data residual, resulting in sequential residual data (405). The source separation estimates the residual between the sequential source simulated data and sequential source measured data. At source and receiver combinations that are not present in the measured data (not acquired), the estimated residual consists of only the simulated data. This missing part (such as near and far offsets) of the shot gathers, determined by processing steps (406), is encoded (407) and then subtracted (410) from the incorrect data residual (409) to obtain a corrected data residual (311). The source separation result can be improved by using multiple encoded data residuals, each computed using a different encoding. In such a case, many of the encoded data residuals can be corrected and then used to update the initial model.

Other variations to the embodiments of FIGS. 1-4 are possible. An advantage of all embodiments of the present inventive method is that they can handle a variety of field geometries to invert real data and realize speed-up due to the simultaneous encoding. The key step of simultaneous source separation followed by processing steps makes the algorithm practical for field data sets. Neelamani et al. [20,21] show that the compute time for simultaneous source separation is significantly less compared to one forward simulation run, which is one of the primary advantages to this approach. Another embodiment of this invention determines the optimal number of sources so that the separation problem is well-posed. Using fewer, farther spaced sources for encoding helps the source separation problem; however, too much separation may cause spatial aliasing in the model update and eventually degrade the subsurface model. On the other hand, encoding too many closely spaced sources makes the separation problem difficult. Thus, depending on the scale length of the subsurface model to be updated and available sources in a survey, an optimal source spacing (i.e. optimal number of sources) can be chosen to balance the two competing considerations. Thus, to make the source separation problem well-posed may require not using all the sources recorded in a survey. In another embodiment, the encoding is changed every iteration of the inversion, or at least in some iterations, as taught by WO 2008/042081.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting updated physical properties model may be downloaded, displayed, or saved to computer storage.

REFERENCES

1. Tarantola, A., "Inversion of seismic reflection data in the acoustic approximation," *Geophysics* 49, 1259-1266 (1984).
2. Sirgue, L., and Pratt G. "Efficient waveform inversion and imaging: A strategy for selecting temporal frequencies," *Geophysics* 69, 231-248 (2004).
3. Fallat, M. R., Dosso, S. E., "Geoacoustic inversion via local, global, and hybrid algorithms," *Journal of the Acoustical Society of America* 105, 3219-3230 (1999).
4. Hinkley, D. and Krebs, J., "Gradient computation for simultaneous source inversion," PCT Patent Application Publication No. WO 2009/117174.
5. Krebs, J. R., Anderson, J. A., Neelamani, R., Hinkley, D., Jing, C., Dickens, T., Krohn, C., Traynin, P., "Iterative inversion of data from simultaneous geophysical sources," PCT Patent Application Publication No. WO 2008/042081.
6. Van Manen, D. J., Robertsson, J. O. A., Curtis, A., "Making wave by time reversal," *SEG International Exposition and 75th Annual Meeting Expanded Abstracts*, 1763-1766 (2005).
7. Berkhout, A. J., "Areal shot record technology," *Journal of Seismic Exploration* 1, 251-264 (1992).
8. Zhang, Y., Sun, J., Notfors, C., Gray, S. H., Cherris, L., Young, J., "Delayed-shot 3D depth migration," *Geophysics* 70, E21-E28 (2005).
9. Van Riel, P., and Hendrik, W. J. D., "Method of estimating elastic and compositional parameters from seismic and echo-acoustic data," U.S. Pat. No. 6,876,928 (2005).
10. Mora, P., "Nonlinear two-dimensional elastic inversion of multi-offset seismic data," *Geophysics* 52, 1211-1228 (1987).
11. Ober, C. C., Romero, L. A., Ghiglia, D. C., "Method of Migrating Seismic Records," U.S. Pat. No. 6,021,094 (2000).
12. Ikelle, L. T., "Multi-shooting approach to seismic modeling and acquisition," U.S. Pat. No. 6,327,537 (2001).
13. Romero, L. A., Ghiglia, D. C., Ober, C. C., Morton, S. A., "Phase encoding of shot records in prestack migration," *Geophysics* 65, 426-436 (2000).
14. Jing X., Finn, C. J., Dickens, T. A., Willen, D. E., "Encoding multiple shot gathers in prestack migration," *SEG International Exposition and 70th Annual Meeting Expanded Abstracts*, 786-789 (2000).
15. Ben-Hadj-Ali, H., Opertor, S., and Vireus, J., "Three-dimensional frequency-domain full waveform inversion with phase encoding," *SEG Expanded Abstracts*, 2288-2292 (2009).
16. Berkhout, A. J., "Changing the mindset in seismic data acquisition," *The Leading Edge* 27-7, 924-938 (2008).
17. Ikelle, L. T., "Coding and decoding: Seismic data modeling, acquisition, and processing," 77th Annual International Meeting, *SEG, Expanded Abstracts*, 66-70 (2007).
18. Jerome R. Krebs, John E. Anderson, David Hinkley, Ramesh Neelamani, Sunwoong Lee, Anatoly Baumstein, and Martin-Daniel Lacasse, "Full-wavefield seismic inversion using encoded sources," *Geophysics* 74-6, WCC177-WCC188 (2009).
19. Neelamani, R., and C. E. Krohn, "Simultaneous sourcing without compromise," presented at the 70th Annual International Conference and Exhibition, EAGE (2008).
20. Neelamani, R., and C. E. Krohn, "Separation and noise removal for multiple vibratory source seismic data," PCT international patent application publication No. WO 2008/123920.
21. Neelamani, R., C. E. Krohn, Krebs, J. R., Deffenbaugh, M., Anderson, J. E., and Romberg, J. K., "Efficient seismic forward modeling using simultaneous sources and sparsity," *SEG Expanded Abstracts*, 2107-2111 (2009).
22. Stefani, J., G. Hampson, and E. F. Herkenhoff, "Acquisition using simultaneous sources," 69th Annual Conference and Exhibition, EAGE, *Extended Abstracts*, B006 (2007).
23. Verschuur, D. J., and A. J. Berkhout, "Target-oriented, least-squares imaging of blended data," 79th Annual International Meeting, SEG, *Expanded Abstracts* (2009).
24. Herrmann, F. J., "Randomized dimensionality reduction for full-waveform inversion," EAGE abstract G001, EAGE Barcelona meeting (2010).
25. Haber, E., Chung M. and Herrmann, "An effective method for parameter estimation with PDE constraints with multiple right hand sides," Preprint—UBC http://www-.math.ubc.ca/~haber/pubs/PdeOptStochV5.pdf (2010).
26. Beasley, C., "A new look at marine simultaneous sources," *The Leading Edge* 27(7), 914-917 (2008).
27. Akerberg, P., G. Hampson, J. Rickett, H. Martin, and J. Cole, "Simultaneous source separation by sparse radon transform," 78th Annual International Meeting, SEG, *Expanded Abstracts*, 2801-2805 (2008).
28. Spitz, S., G. Hampson, and A. Pica, "Simultaneous source separation: a prediction-subtraction approach," 78th Annual International Meeting, SEG, *Expanded Abstracts*, 2811-2815 (2008).

The invention claimed is:
1. A computer-implemented method for simultaneous inversion of measured geophysical data from multiple encoded sources to determine a physical properties model for a subsurface region, the measured geophysical data resulting from a survey for which a fixed-receiver assumption of simultaneous encoded-source inversion may not be valid, said method comprising:
using a computer, performing a simultaneous model-simulation of a multiple encoded-source gather of data, or generating an encoded data residual computed from a simultaneous model-simulation of a multiple encoded-source gather of data, then performing simultaneous-source separation, based on the source encoding, to lessen any effect of the measured geophysical data's not satisfying the fixed-receiver assumption, wherein a data processing step coming after the simultaneous-source separation acts to conform the separated model-simulated data to the measured geophysical data for source and receiver combinations that are missing in the measured geophysical data due to failure of the fixed-receiver assumption.

2. The method of claim 1, wherein the method comprises:
constructing an initial physical properties model and using it to simulate synthetic data corresponding to the measured geophysical data, wherein sources and/or receivers in the simulation are encoded and simulated simultaneously, thereby generating simulated encoded data;
separating the simulated encoded data according to source, resulting in simulated sequential-source data;
processing the simulated sequential-source data to make them conform to the measured geophysical data for source and receiver combinations that are missing in the measured geophysical data;

computing differences, called data residuals, between the processed simulated sequential source data and the measured geophysical data for source and receiver combinations that are present in the measured geophysical data;

encoding the data residuals using the same or different encoding as was used in generating the simulated encoded data;

using the encoded data residuals to compute an update to the initial physical properties model; and combining the update with the initial model to form an updated physical properties model.

3. The method of claim 2, wherein the encoded data residuals are used to compute a gradient of an objective function, said gradient being with respect to parameters of the physical properties model, which is then used in a selected optimization scheme to update the physical properties model.

4. The method of claim 2, further comprising iterating the method steps at least one time, using the updated physical properties model from one iteration as the initial model for a next iteration.

5. The method of claim 4, wherein the sources are encoded using a selected set of encoding functions, and wherein a different set of encoding functions is selected for at least one of the iterations.

6. The method of claim 2, further comprising at any time before the computing differences step:

encoding the measured geophysical data, using the same or different source encoding as was used in generating the simulated encoded data;

separating the encoded measured data according to source using a source separation algorithm that was also used in separating the simulated encoded data according to source; and using the separated measured data in computing the data residuals.

7. The method of claim 2, further comprising after the separating step and before the computing differences step, removing source-receiver locations from the simulated sequential-source data to correspond to source-receiver locations with missing data in the measured geophysical data.

8. The method of claim 7, wherein the removing source-receiver locations from the simulated sequential-source data is accomplished by one or more data processing steps from a group consisting of offset muting, meaning removing of near or far offsets or both; muting based on type of arrivals including transmission versus reflection component of data, and removing the data's elastic component where forward simulation is based on an acoustic assumption.

9. The method of claim 2, wherein encoding the data residuals means that each data residual is encoded by temporally convolving all traces from the data residual with an encoding function selected for the data residual.

10. The method of claim 1, wherein the method comprises:
constructing an initial physical properties model and using it to simulate synthetic data corresponding to the measured geophysical data, wherein sources and/or receivers in the simulation are encoded using selected encoding functions and simulated simultaneously, thereby generating simulated encoded data;
separating the simulated encoded data according to source or receiver using a source or receiver separation algorithm, resulting in simulated sequential source and/or receiver data;

processing the simulated sequential source or receiver data to mute those data, referred to as missing data, corresponding to source and receiver combinations that are missing in the measured geophysical data;

encoding the missing data, using encoding functions that are the same or different than said selected encoding functions;

encoding the measured geophysical data and subtracting them, according to source and receiver position, from the simulated encoded data, thereby generating encoded data residuals, which will be incorrect due to the missing source and receiver combinations in the measured geophysical data;

subtracting the encoded missing data from the encoded data residuals to generate corrected encoded data residuals;

using the corrected encoded data residuals to compute an update to the initial physical properties model; and combining the update with the initial model to form an updated physical properties model.

11. The method of claim 10, further comprising iterating the method steps at least one time, using the updated physical properties model from one iteration as the initial model for a next iteration.

12. The method of claim 11, wherein the encoding functions are changed for at least one of the iterations.

13. The method of claim 10, wherein fewer than all source or receiver locations in the measured geophysical data are used in the generating simulated encoded data in order to improve accuracy of the source or receiver separation algorithm by making the separation well-posed, but not reducing sampling of the measured geophysical data to an extent that causes aliasing.

14. The method of claim 10, wherein the missing data occur at near and far ends of the measured geophysical data's offset range.

15. The method of claim 10, wherein the measured geophysical data are divided into common-source or common-receiver gathers, and encoding the measured geophysical data comprises, for each gather of the measured geophysical data, temporally convolving all traces from the gather with an encoding function selected for the gather.

16. The method of claim 10, wherein the encoding the measured geophysical data is accomplished by obtaining gathers of data from a geophysical survey in which data are acquired from a plurality of simultaneously operating, uniquely encoded source devices.

17. The method of claim 1, wherein the method comprises:
constructing an initial physical properties model and using it to simulate synthetic data corresponding to the measured geophysical data, wherein sources and/or receivers in the simulation are encoded, using selected encoding functions, and simulated simultaneously, thereby generating simulated encoded data;

using said selected encoding functions to encode the measured geophysical data and subtracting them, according to source and receiver position, from the simulated encoded data, thereby generating encoded data residuals, which will include incorrect values due to the missing source and receiver combinations in the measured geophysical data;

separating the encoded data residuals according to source or receiver using a source or receiver separation algorithm, resulting in sequential residual data;

processing the sequential residual data to estimate simulated data, referred to as missing data, corresponding to source and receiver combinations that are missing in the measured geophysical data;

encoding the missing data, using said selected encoding functions;

subtracting the encoded missing data from the encoded data residuals to generate corrected encoded data residuals;

using the corrected encoded data residuals to compute an update to the initial physical properties model; and combining the update with the initial model to form an updated physical properties model.

18. The method of claim 1, wherein the geophysical data are seismic data, of which a full wavefield is inverted.

19. The method of claim 1, wherein a plurality of encoded data sets are used to perform the simultaneous-source separation.

20. A method for producing hydrocarbons from a subsurface region, comprising:

performing a geophysical survey of the subsurface region resulting in measured geophysical data;

processing the measured geophysical data on a computer by a method of claim 1 to generate a physical properties model of the subsurface region;

assessing hydrocarbon potential of the subsurface region using the physical properties model; and drilling a well into the subsurface region based at least in part on the assessment of hydrocarbon potential, and producing hydrocarbons from the well.

21. A computer program product, comprising a non-transitory computer usable medium having a computer readable program code embodied therein, said computer readable program code adapted to be executed to implement a method for full-wavefield inversion of measured geophysical data to determine a physical properties model for a subsurface region, said method comprising:

constructing or inputting an initial physical properties model and using it to simulate synthetic data corresponding to the measured geophysical data, wherein sources or receivers in the simulation are encoded and simulated simultaneously, thereby generating simulated encoded data;

separating the simulated encoded data according to source, resulting in simulated sequential-source data;

computing differences, called data residuals, between the simulated sequential source data and the corresponding measured geophysical data;

encoding the data residuals according to source using the same encoding as was used in generating the simulated encoded data;

using the encoded data residuals to compute an update to the initial physical properties model; and combining the update with the initial model to form an updated physical properties model.

22. A computer program product, comprising a non-transitory computer usable medium having a computer readable program code embodied therein, said computer readable program code adapted to be executed to implement a method for full-wavefield inversion of measured geophysical data to determine a physical properties model for a subsurface region, said method comprising:

constructing or inputting an initial physical properties model and using it to simulate synthetic data corresponding to the measured geophysical data, wherein sources or receivers in the simulation are encoded using selected encoding functions and simulated simultaneously, thereby generating simulated encoded data;

separating the simulated encoded data according to source or receiver using a source or receiver separation algorithm, resulting in simulated sequential source or receiver data;

processing the simulated sequential source or receiver data to mute those data, referred to as missing data, corresponding to source and receiver combinations that are missing in the measured geophysical data;

encoding the missing data, using encoding functions that are the same or different than said selected encoding functions;

encoding the measured geophysical data, using encoding functions that are the same as used in the encoding the missing data, and subtracting them, according to source and receiver position, from the simulated encoded data, thereby generating encoded data residuals;

subtracting the encoded missing data from the encoded data residuals to generate corrected encoded data residuals;

using the corrected encoded data residuals to compute an update to the initial physical properties model; and combining the update with the initial model to form an updated physical properties model.

23. A computer program product, comprising a non-transitory computer usable medium having a computer readable program code embodied therein, said computer readable program code adapted to be executed to implement a method for full-wavefield inversion of measured geophysical data to determine a physical properties model for a subsurface region, said method comprising:

constructing or inputting an initial physical properties model and using it to simulate synthetic data corresponding to the measured geophysical data, wherein sources or receivers in the simulation are encoded, using selected encoding functions, and simulated simultaneously, thereby generating simulated encoded data;

using said selected encoding functions to encode the measured geophysical data and subtracting them, according to source and receiver position, from the simulated encoded data, thereby generating encoded data residuals;

separating the encoded data residuals according to source or receiver using a source or receiver separation algorithm, resulting in sequential residual data;

processing the sequential residual data to estimate simulated data, referred to as missing data, corresponding to source and receiver combinations that are missing in the measured geophysical data;

encoding the missing data, using said selected encoding functions;

subtracting the encoded missing data from the encoded data residuals to generate corrected encoded data residuals;

using the corrected encoded data residuals to compute an update to the initial physical properties model; and combining the update with the initial model to form an updated physical properties model.

* * * * *